May 24, 1949.　　　　W. P. LEAR　　　　2,471,220
REMOTE POSITIONING AND INDICATING SYSTEM
Filed Jan. 11, 1944　　　　3 Sheets-Sheet 1
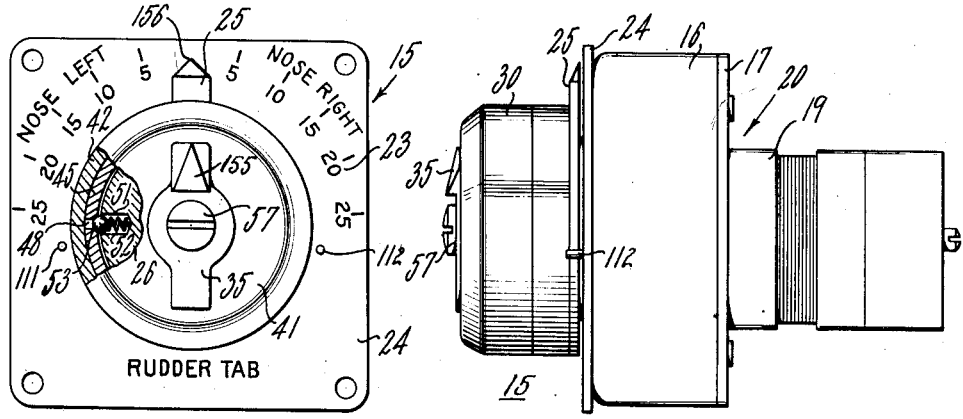
*Fig. 1*　　　　*Fig. 2*
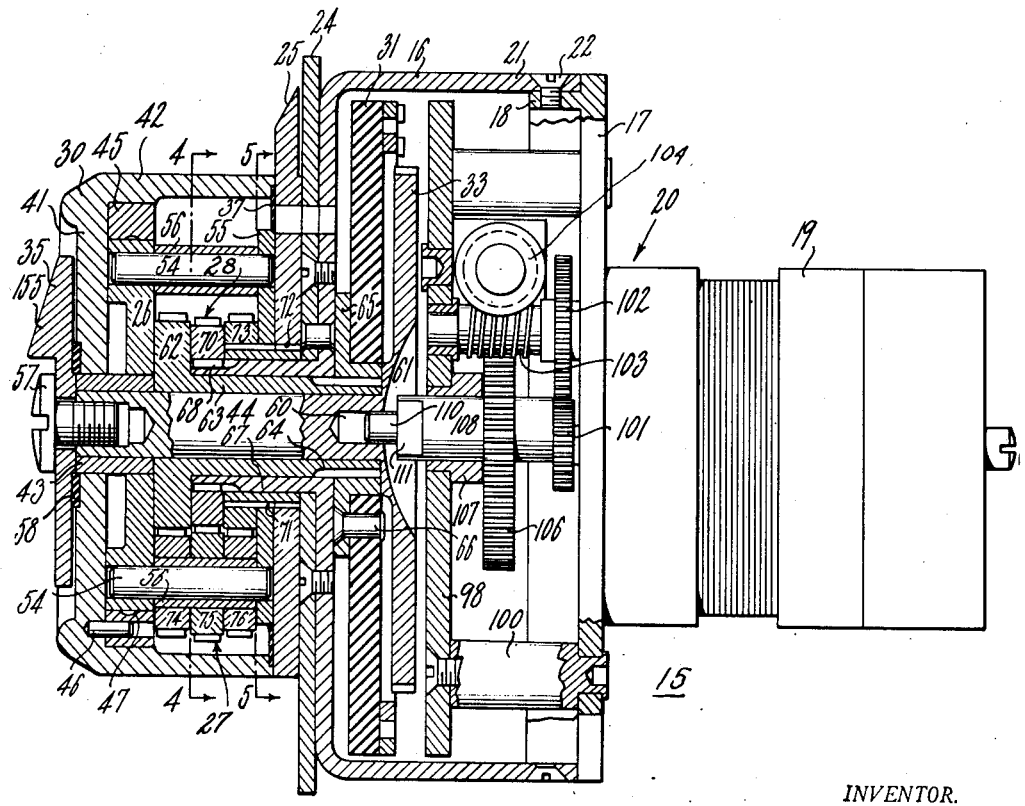
*Fig. 3*
INVENTOR.
WILLIAM P. LEAR
BY
ATTORNEY

INVENTOR.
WILLIAM P. LEAR

May 24, 1949. W. P. LEAR 2,471,220
REMOTE POSITIONING AND INDICATING SYSTEM
Filed Jan. 11, 1944 3 Sheets-Sheet 3
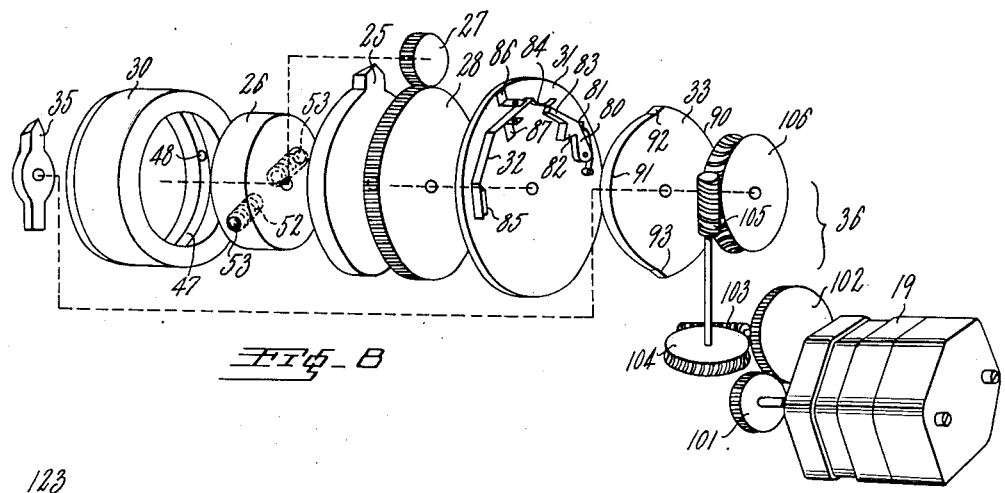
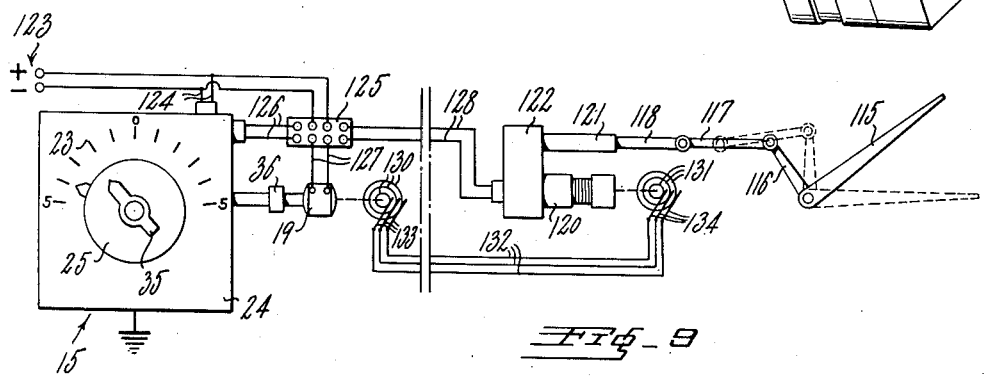
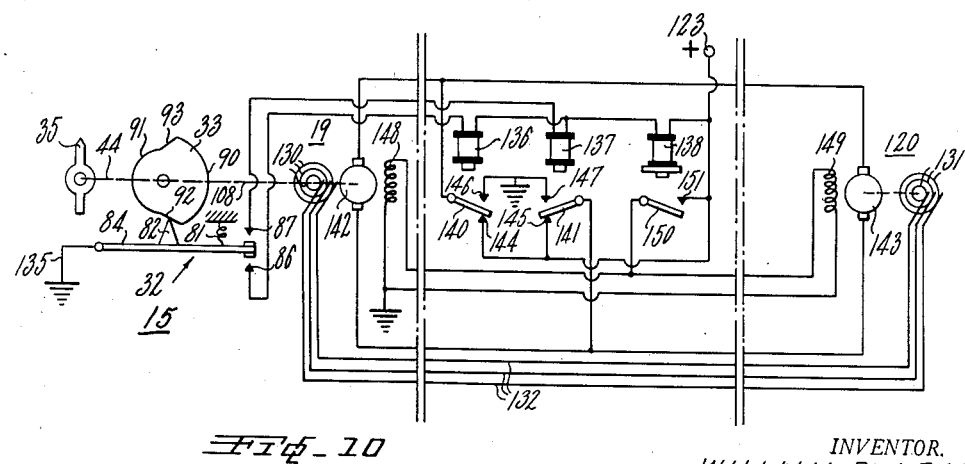
INVENTOR.
WILLIAM P. LEAR
BY
Richard A. Mansen
ATTORNEY Patented May 24, 1949

2,471,220

UNITED STATES PATENT OFFICE 2,471,220

REMOTE POSITIONING AND INDICATING SYSTEM

William P. Lear, North Hollywood, Calif., assignor, by mesne assignments, to Lear, Incorporated, Grand Rapids, Mich., a corporation of Illinois Application January 11, 1944, Serial No. 517,831

7 Claims. (Cl. 318—31)

This invention relates to an electrical remote positioning and indicating system, and more particularly to a novel remote positioning and indicating unit for controlling a motor driven positionable member aboard an aircraft.

The present invention is particularly adapted for use aboard aircraft, where various accessories such as wing flaps, rudder tabs and landing gear are positioned by means of rotary or linear mechanical actuators powered by electric motors. It is necessary that such accessories be moved to and retained in certain designated positions at the control of the pilot. For this purpose, it is desirable to provide, adjacent the pilot's compartment, and preferably on the instrument panel, simple reliable remote control means by which the position of the accessories may be controlled and their position at all times indicated to the pilot.

It is, among the objects of this invention to provide a novel remote positioning and indicating unit for predetermining or presetting the degree of desired motion to take place in a movable member; to provide such a unit having a visual position indicator; to provide such a unit acting as a manually operated off and on switch for the control of the power means for an actuator operating the movable member; to provide such a unit which is compact, of small dimensions and has operating parts arranged as a complete unit which may be readily assembled and disassembled from an instrument panel; to provide such a unit including a manually operated position selector and a position indicator operated by means synchronously connected to driving means for an actuator operating the movable member; to provide a system including such unit and dynamic braking means for substantially instantaneously stopping motion of the position indicator and the movable member when the latter have reached the desired preselected position; and to provide a remote positioning and indicating system embodying such novel remote positioning and indicating unit.

These and other objects, advantages and features of the invention will be apparent from the following description and accompanying drawings. In the drawings:

Fig. 1 is a front view of a remote positioning and indicating unit forming part of the invention.

Fig. 2 is a side elevation view of the unit illustrated in Fig. 1.

Fig. 3 is an elevational view on an enlarged scale and partly in section of the unit illustrated in Figs. 1 and 2.

Fig. 8 is a schematic view, exploded horizontally, of the position selecting and indicating unit.

Fig. 9 is a schematic view of a complete position selecting and indicating system according to the present invention.

Fig. 10 is a schematic wiring diagram illustrating circuit connections for the system illustrated in Fig. 9.

Figure 4:
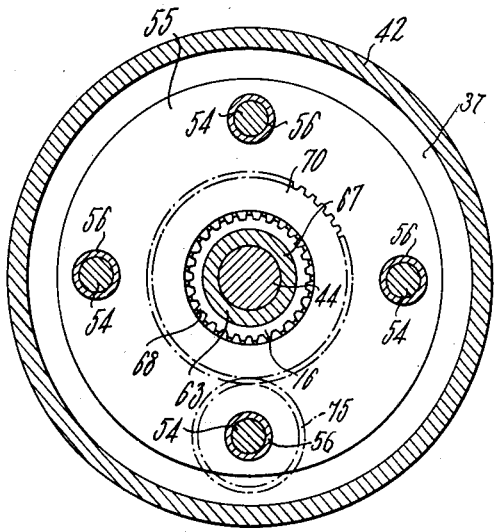
Fig. 4 is a cross-sectional view on the line 4—4 of Fig. 3.
Figure 5:
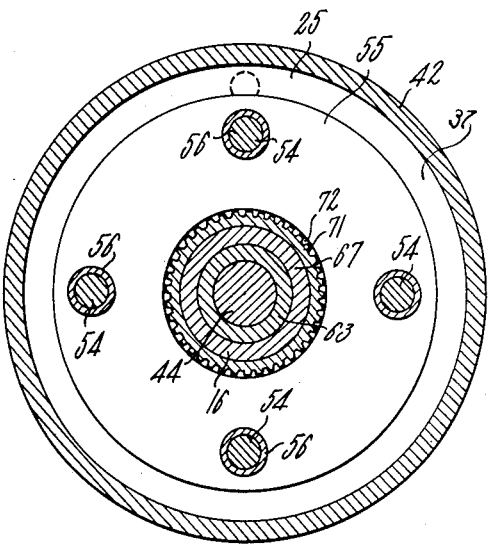
Fig. 5 is a cross-sectional view on the line 5—5 of Fig. 3.

According to the present invention, a position selecting and indicating unit is provided including a manually operated position indicator. Such position selector and indicator is operated, through reduction gearing, by a control knob mounted on the front of the mechanism. The control knob also operates a switch mounting plate which is operatively associated with a cam in such a manner that, upon movement of the plate, the switch mounted thereon is closed in one direction or the other to energize a motor operating an actuator connected to the member to be positioned. Upon the closing of the circuit thereto, the actuator motor operates to move the movable member to the indicated position. Simultaneously, means forming part of the unit is operated in synchronism with the actuator motor, to move the aforementioned cam and a position indicator into coincidence with the position selector. When such coincidence is achieved, the cam operates to open the switch on the mounting plate, deenergizing the actuator motor and, preferably, effecting a dynamic braking circuit therefor.

Referring more particularly to Figs. 1 through 8 of the drawings, the invention includes a position selecting and indicating unit 15 comprising a housing 16 enclosing the selecting and indicating mechanism to which is secured means 20 arranged to operate the position indicator 35 in synchronism with an actuator driven positionable member. In the present instance, the means 20 comprises a direct current motor drive unit provided with a mounting plate 17 having a flange 18 secured to a flange 21 of housing 16 by detachable means such as screws 22. The selecting and indicating unit includes an operating knob 30 which is adapted to move a position selector or pointer 25 in cooperation with indicia 23 which may be provided on the face plate 24 of the mechanism.

Through an arrangement to be described hereinafter, operation of selector knob 30 effects energization of an electric motor driving a remote actuator for a movable member. Drive unit 20 is electrically connected to the remote actuator for the movable member in such a manner that it will operate position indicator 35 in synchronism with the movable member. When position indicator 35 is brought into coincidence with position selector 25, the electric motor for the movable member actuator is automatically deenergized, as will be described.

In the present instance, drive unit 20 includes an electric motor 19 which is electrically connected to the motor for the actuator in such a manner as to operate in synchronism therewith. For example, motor 19 and the actuator motor may be synchronous alternating current motors operated from the same source of alternating current. However, as is often the case on aircraft, motor 19 and the actuator motor may be direct current motors as these will operate from the storage batteries normally carried aboard the aircraft and have a high initial torque value. Synchronizing means must be provided for such direct current motors. Also where desirable, a flexible shaft may be used in place of motor unit 20 to couple indicator 35 to the remote actuator, similarly to the arrangement shown in my Patent No. 2,355,381, issued August 8, 1944 for "Preselection control mechanism" and assigned to the same assignee.

For a general understanding of the operation of the position selecting and indicating mechanism, reference may be had to the exploded view, Fig. 8. Control knob 30 is connected through a safety or slip clutch 26 to reduction gearing schematically illustrated at 27 and 28. Clutch 26 is provided to insure that position selector 25 will be moved at substantially the same rate of movement as the actuator driven positionable member. Thus, if the operator, such as a pilot, rotates knob 30 at a rate in excess of the normal rate of movement for which the positionable member is designed, slip clutch 26 will disengage and no movement will be transmitted from knob 30 to position selector 25 until such time as clutch 26 again becomes engaged, namely after substantially a complete revolution of knob 30. Member 28 of the reduction gearing is connected to the position selector 25 and likewise to a switch mounting plate 31 on which is mounted a single-pole double-throw switch 32.

Reduction gearing 27, 28 is provided to move position selector 25 at a rate substantially equal to a rate of movement of the positionable member. The reduction ratio of gearing 27, 28 is selected after consideration of the desired operating speed of the positionable member with respect to the possible operating speed of the control knob 30. This affords the pilot a natural "feel" he desires for controlling remote members on the airplane. In the present instance, a reduction ratio of substantially twenty to one has been found to be satisfactory. Cam-switch 32 is adapted to be operated by a cam 33 mechanically connected with position indicator 35. Cam 33 and indicator 35 are arranged to be driven by motor 19 through reduction gearing illustrated generally at 36. Upon actuation of knob 30, selector 25 through slip clutch 26 and reduction gearing 27, 28, is moved at a reduced rate to the indicated position. At the same time, mounting plate 31 is moved in one direction or the other so that cam 33 will close one or the other of the contacts of switch 32.

In a manner to be described more fully hereinafter, cam 33 closes the contacts of switch 32 to complete a circuit for the actuator motor for operation thereof in a direction to position the movable member in accordance with the direction of movement of position selector 25. Operation of the actuator motor effects movement of drive unit 20 in a direction to bring position indicator 35 into coincidence with position selector 25. Drive unit 20 also operates cam 33 in synchronism with position indicator 35. When coincidence between indicator 35 and selector 25 is achieved, cam 33 will have moved switch 32 to a neutral position deenergizing the actuator motor. In a preferred embodiment of the invention, such deenergization activates a dynamic braking circuit for the actuator motor as will be described. In the present instance, switch 32 also controls energization of motor 19 of drive unit 20 for operation in synchronism with the actuator motor.

Referring more particularly to Figs. 3 through 7 showing details of the selector unit, knob 30 comprises a disk portion 41 and a rim portion 42 which forms a housing enclosing the reduction gearing for the indicating mechanism. A gasket 37 is interposed between rim 42 and selector 25. Knob 30 is rotatably mounted on a bushing 43 disposed on a shaft 44. An annular member 45 is secured to disk portion 41 by pins 46 and is formed with a shallow groove 47 (Fig. 3) around its inner periphery. Adjacent one part of its periphery, member 45, as may be seen more clearly in Fig. 1, is formed with an aperture 48 intersecting groove 47.

Clutch 26 is disposed internally of member 45 and likewise mounted on bushing 43, and has a recess 51 in which is disposed a spring 52. Spring 52 urges a ball 53 into engagement with groove 47. Normally, ball 53 engages aperture 48 to form a slip connection between knob 30 and clutch 26. A plurality of pins 54 extend between clutch 26 and a backing plate 55, and sleeves 56 on the pins maintain clutch 26 and plate 55 properly spaced. As explained heretofore, the function of clutch 26 is to insure movement of selector 25 at a rate not greater than the normal rate of movement of the member to be positioned.

Shaft 44 is formed as an integral extension of cam 33 and position indicator 35 is secured to the outer end of shaft 44 by a screw 57. A spring washer 58 is interposed between indicator 35 and disk portion 41 of knob 30. Adjacent its inner end, shaft 44 is formed with recess 60, and cam 33 is formed with a shallow arcuate groove 61 having parallel sides, as shown more clearly in Fig. 6. Recess 60 receives the reduced end 110 of a shaft 108, forming part of unit 20, and groove 61 receives a flattened portion 111 of shaft 108. This arrangement establishes a detachable driving connection between drive unit 20 and selector and indicator unit 15.

A gear 62, formed with an elongated hub 63, is mounted on shaft 44 abutting bushing 43. The inner end of hub 63 is splined at 64 and engages an internally splined bushing 65 secured by rivets 66 to switch mounting plate 31. Housing 16 is formed with a tubular extension 67 surrounding hub 63 and having a splined inner end 68 engaging a gear 70. Gear 70 is therefore fixed with respect to housing 16. A splined sleeve 71 surrounds extension 67 and extends through an aperture in plate 55 on the opposite side of which its teeth engage internal teeth 72 on position selector 25. A gear 73 has a splined hub engaging the splined inner end of sleeve 71 and is rotatable with selector 25.

Three pinions 74, 75 and 76 are disposed in adjacent relation and fixed to sleeve 66 on one of the pins 54. Pinions 74, 75 and 76 mesh, respectively, with gear 62, gear 70 and gear 73. It will be noted that gears 62 and 73 are substantially equal in external diameter whereas gear 70 is somewhat smaller in diameter. Gears 62 and 73 are, in operative effect, a single gear corresponding to gear 28 of Fig. 8. Likewise, pinions 74 and 76 are substantially equal in diameter and, in operative effect, comprise a single pinion, whereas pinion 75 is somewhat larger in diameter. Accordingly, rotation of the pinion unit, which corresponds to pinion 27 of Fig. 8, will effect differential rotation of gears 62 and 73 with respect to gear 70. The ratio of movement will be proportional to the number of teeth difference between gear 70 and gears 62 and 73. Thus, selector 25 will be moved at a greatly reduced rate with respect to knob 30. Such gear reduction achieves fineness of control of position selector 25.

Figure 6:
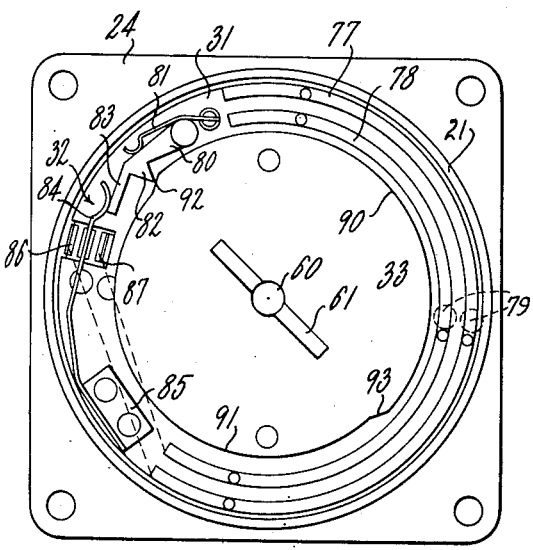
Fig. 6 is a plan view of a cam and switch arrangement forming part of the invention.
Figure 7:
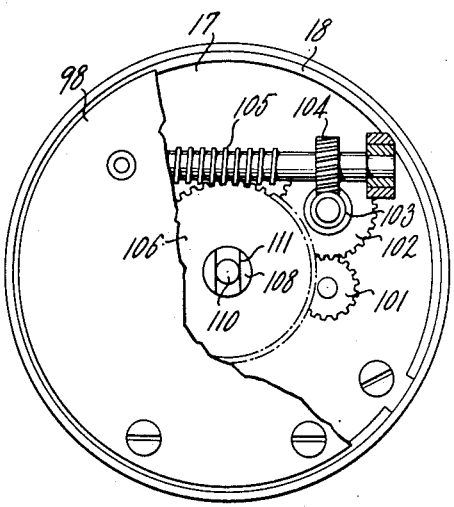
Fig. 7 is an end elevational view of reduction gearing adapted to connect an electric motor to the position indicating unit shown in Figs. 1, 2 and 3.

As shown more clearly in Fig. 6, switch mounting plate 31 is provided with discontinuous slip rings 77 and 78. Adjacent one end of the slip rings, a movable switch arm 80 is pivoted to plate 31 and normally urged in an inward direction by a spring 81. Switch arm 80 is formed with a radially inwardly directed projection 82 adapted to cooperate with cam 33. The outer end 83 of arm 80 engages a spring contact 84 forming part of switch 32. Spring contact 84 is mounted on a block 85 secured to plate 31 adjacent the opposite end of rings 77 and 78. Contact 84 is adapted to engage either one of a pair of spaced contacts 86 and 87, and the arrangement is such that contact 84 is normally urged toward contact 87. Contacts 86, 87 are connected to slip rings 77, 78, as diagrammatically indicated and brushes 79, 79 connect the slip rings in the motor control circuit.

Cam 33 is formed with semi-circular surfaces 90 and 91 which are joined by diametrically opposite sloping or neutral position surfaces 92 and 93. When the projection 82 on switch arm 80 engages either cam surface 92 or 93, contact 84 is held in a neutral position between contacts 86 and 87. If plate 31 is moved relative to cam 33, projection 82 will engage either of the semicircular surfaces 90 or 91 to cause engagement between contact 84 and contact 86 or 87 respectively. Suitable brush means, not shown, are provided for making electrical contact with slip rings 77 and 78 which are operatively connected with switch 32.

As explained hereinabove, drive unit 20 is detachably secured to the indicator mechanism housing 16. Motor 19 is eccentrically mounted on plate 17. An outer plate 98 is secured to posts 100 mounted in plate 17. The motor pinion 101 meshes with a gear 102 secured to a worm 103. Gear 102 and worm 103 are mounted in suitable bearings in plates 17 and 98. Worm 103 engages a worm gear 104 secured on a worm 105. Gear 104 and worm 105 are likewise mounted in suitable bearings secured to plates 17 and 98. Worm 105 meshes with a second worm gear 106 mounted in a bearing 107 secured to plate 98. The shaft 108 of worm gear 106 is formed with a reduced outer end portion 110 engaging recess 60 in shaft 44, and with a flattened portion 111 engaging the recess 61 in cam 33. This arrangement provides a detachable driving connection between shaft 108, cam 33 and shaft 44.

The preselection mechanism thus far described operates as follows. Knob 30 is turned to set selector 25 at the desired point with respect to indicia 23. When the operator turns knob 30, clutch 26 is driven through ball 53. However, if knob 30 is rotated at a rate exceeding the actual rate of movement of the actuator positioned movable member, the clutch will slip. Thereby, the positional member is moved at a rate substantially the same as it normally would be if manually operated by the pilot through direct mechanical means. Movement of knob 30 thus gives the pilot the same natural "feel" he would obtain if he were manually operating the positionable member.

Rotation of clutch member 26 revolves pinions 74, 75 and 76 about the peripheries of gears 62, 70 and 73. For operative purposes, pinions 74 and 76 may be considered as one pinion and gears 62 and 73 as a single gear. Due to the difference in the diameters and the number of teeth of gears 62 and 73 with respect to gear 70, relative rotation of gear 70 with respect to gears 62 and 73 will be obtained. Gear 70 is fixed. Therefore, as pinions 74, 75 and 76 rotate around the gears, gears 62 and 73 will be rotated with respect to gear 70 by an amount proportional to the number of teeth difference between gears 62 and 73 and gear 70. In turn, these will cause a corresponding displacement of selector 25 and switch mounting plate 31 in unison. Stops 111 and 112 (Fig. 1) limit movement of selector 25 in either direction.

Displacement of plate 31 causes switch arm 80 to be moved with respect to cam 33, out of engagement with neutral cam portion 92 or 93, and to engage either surface 90 or surface 91 thereof. This engages movable switch contact 84 with one of the fixed contacts 86 or 87 to effect energization of the actuator motor in a direction to move the positionable member in accordance with the direction of movement of selector 25. The actuator motor is energized over circuits described in connection with Figs. 9 and 10. Drive unit 20, operating in synchronism with the actuator for the positionable member, moves cam 33 and indicator 35 in synchronism with the movement of the movable member and in a direction to restore coincidence between selector 25 and indicator 35. When the selector and indicator are brought into coincidence, projection 82 of switch arm 80 engages either neutral portion 92 or 93 of cam 33, thus moving movable switch contact 84 to its neutral position and breaking the energizing circuit for the actuator motor. In the present instance, switch 32 also controls the energizing circuit for motor 19 which operates in synchronism with the actuator motor.

The use of the preselector mechanism of the present invention in a remote positioning and indicating system will now be described more particularly with reference to Figs. 9 and 10. In Fig. 9, preselector unit 15 is shown as arranged to control the position of a movable member 115 which may be, for instance, a flap or an intercooler shutter of an airplane. Flap 115 is provided with a crank arm 116 connected through link 117 to the extensible member 118 of a mechanical actuator, which may be of the type described and claimed in my copending application Serial No. 483,515, filed April 17, 1943, now Patent 2,469,269, issued May 3, 1949, entitled "Unitary mechanical actuator device." In the present instance, the electromagnetic clutch and brake unit of said copending application is omitted, and the actuator motor 120 drives a screwjack 121 directly through the medium of gearing contained in a housing 122. Braking is provided by a dynamic braking arrangement.

A source of electric power, in the present instance direct current, is indicated at 123 and is connected to switch 32 by leads 124. Indicator 15 is connected to control box 125 by leads 126, and motor 19 is connected thereto by leads 127. Other leads 128 connect control box 125 to motor 120. Drive unit 20 and motor 120 are operated in synchronism. In the present instance, drive unit 20 includes direct current motor 19, motor 120 likewise being a direct current type. In order that direct current motors 19 and 120 will operate in synchronism, each motor is provided with a set of slip rings 130 and 131, respectively. Rings 130 or 131 are connected to electrically spaced points of the armature windings of the motors. Circuit connections 132 interconnect the slip rings 130 and 131 through brushes 133 and 134, respectively.

As will be understood by those skilled in the art, upon a relative displacement of the armatures of motors 130 and 131, circulating currents will be introduced into leads 132 to maintain synchronous rotation of the D. C. motors. Motor 120 is a relatively large motor having sufficient power to operate actuator 121, whereas motor 19 is a relatively tiny motor of sufficient power to operate indicator 35 and cam 33 through reduction gearing 36. Accordingly, the synchronizing action is substantially all effected on relatively small motor 19, the relatively small circulating currents having a correspondingly greatly increased effect upon motor 19 as compared to their effect upon the much larger motor 120. Thereby, motor 19 is effectively tied to motor 120 for operation in synchronism therewith.

In Fig. 9, the system is shown at an intermediate point of a control cycle. Position selector 25 has been moved counter-clockwise to the point "4." This has effected an energization of motors 19 and 120. These motors operate in synchronism, as previously described. Motor 120, through screwjack 121, moves flap 115. In synchronism therewith, motor 19 moves cam 33 and position indicator 35 toward coincidence with position selector 25. When member 115 has been moved to the position of selector 25, indicator 35 will coincide with selector 25 and both motors will be deenergized through the action of cam 33 on the switch 32.

An electric circuit arrangement for accomplishing the foregoing using a direct current motor drive as used in many aircraft installations is indicated schematically in Fig. 10. Direct current motors operate off storage batteries and have high initial torque values. As shown in Figure 10, movable contact 84 of switch 32 is adapted to connect either contact 86 or 87 to ground. Contact 86 is connected to one terminal of a relay 136, and contact 87 is connected to one terminal of relay 137. The opposite terminals of relays 136 and 137 are connected in parallel with each other and in series with one terminal of a slow release or delayed action type of relay 138. The opposite terminal of relay 138 is connected to the positive side of source 123. Relays 136 and 137 are provided with contact arms 140 and 141, respectively, which are connected to opposite terminals of armatures 142 and 143 of motors 19 and 120, respectively. It will be noted that motor armatures 142 and 143 are connected in parallel with each other across their brushes. Normally, arms 140 and 141 engage back contacts 144 and 145 of relays 136 and 137, respectively, which are connected to positive terminal 123. Front contacts 146 and 147 of relays 136 and 137 are connected to ground. Fields 148 and 149 of motors 19 and 120, respectively, are likewise connected in parallel. One side of the fields is connected to ground and the other side is connected to a normally open contact arm 150 of relay 138. Front contact 151 of relay 138 is connected to the positive terminal of the source 123.

Should selector knob 30 be moved in such direction as to cause switch arm 84 to engage the contact 86, relay 136 will be energized which, through its front contact 146, will connect one side of armatures 142 and 143 to ground. The opposite side of the armatures will remain connected to the positive terminal of source 123 through back contact 145 of relay 137. Relay 138 will be energized at the same time to connect fields 148 and 149 across the circuit. Motors 19 and 120 will thereupon operate in synchronism, as previously described, until such time as cam 33 attains a position where projection 82 engages sloping surface 92 or 93. At such time, indicator 35 will be in coincidence with selector 25. Relays 136 and 138 will thereupon become deenergized. When relay arm 140 engages back contact 144, a direct short-circuit will be placed across armatures 142 and 143 through relay armatures 140 and 141. As relay 138 is a slow release relay, its armature 150 will remain in engagement with front contact 151 for a small interval of time, thus keeping motor fields 148 and 149 energized. The result is that the motors 19 and 120 act as generators feeding into a short-circuit. This will cause substantially instantaneous stopping of the armatures 142 and 143 by dynamic braking. Subsequent to the time of such stopping, relay armature 150 will drop, opening the motor fields and restoring the circuit to the positions shown in Fig. 9. The stopping has to be substantially instantaneous, as otherwise switch 32 would be closed in the opposite direction to cause reverse movement of the motors. Such reverse movement would not, however, destroy the efficacy of the system, as it would simply mean that cam 33 would be restored to a position wherein the projection 82 engages one of its sloping surfaces 92 or 93 restoring switch 32 to its neutral position. Thus indicator 35 and cam 33 are driven in synchronous relation with member 115 and actuator 122.

A further feature of the invention is the provision of a projection 155 (Figs. 1, 2 and 3) on the indicator 35. The pilot can tell merely by feeling the projection 155 and the point 156 of selector 25, when the two elements coincide and thereby ascertain that member 115 has attained its preselected actuated position. This feature is useful in the event it is necessary to operate the device under conditions where no light is available or visual perception not feasible.

Although a specific embodiment has been shown and described for the purpose of illustrating the application of the principles thereof, it

What is claimed is:

1. A position preselecting and indicating unit comprising, in combination, a housing; said housing having a tubular extension; a shaft extending through said extension; a sleeve rotatably mounted on said shaft; a switch mounting plate in said housing secured to the inner end of said sleeve; a cam in said housing secured to the inner end of said shaft; a position selector mounted on said housing; means securing said selector against rotation relative to said sleeve; a position indicator; means securing said position indicator to the outer end of said shaft; a cup shaped knob rotatably mounted on said shaft; a clutch device rotatably mounted on said shaft within said knob; releasable means normally connecting said knob and clutch device for movement as a unit; reduction gearing mounted in said knob and operatively connecting said clutch device to said position selector and said switch mounting plate; switch means on said switch mounting plate operatively associated with said cam selectively operable by displacement of said cam from a neutral position; an electric motor mounted on said housing; gearing operatively connecting said motor to said cam; and circuit connections between said switch means and said motor.

2. A position preselecting and indicating unit comprising, in combination, a housing; said housing having a tubular extension; a shaft extending through said extension; a sleeve rotatably mounted on said shaft; a switch mounting plate in said housing secured to the inner end of said sleeve; a cam in said housing secured to the inner end of said shaft; a position selector mounted on said housing; means securing said selector against rotation relative to said sleeve; a position indicator; means securing said position indicator to the outer end of said shaft; a cup shaped knob rotatably mounted on said shaft; a clutch device rotatably mounted on said shaft within said knob; releasable means normally connecting said knob and clutch device for movement as a unit; reduction gearing mounted in said knob and operatively connecting said clutch device to said position selector and said switch mounting plate; switch means on said switch mounting plate operatively associated with said cam; an electric motor mounted on said housing; gearing operatively connecting said motor to said cam selectively operable by displacement of said cam from a neutral position; and circuit connections between said switch means and said motor; said position selector and said position indicator each being formed with a protuberance whereby the relative positions thereof may be determined by the sense of touch of an operator.

3. A position preselecting and indicating mechanism comprising, in combination, a housing, said housing having a tubular extension with a splined outer end; a first gear having a hub portion extending through said extension into said housing, the inner end of said hub portion being splined; a cam rotatably mounted in said housing; a shaft secured to said cam and extending outwardly through and beyond said gear hub portion; a position indicator secured to the outer end of said shaft; a cup shaped knob rotatably mounted on said shaft; a splined sleeve rotatable on said tubular extension; a position selector mounted on said housing; a switch mounting plate rotatably mounted in said housing, said switch mounting plate being fixed to the inner end of said gear hub portion; a second gear fixed on the splined outer end of said tubular housing extension; a third gear fixed on the outer end of said splined sleeve; said second gear being mounted between said first gear and said third gear; said position selector being fixed to the inner end of said splined sleeve and being mounted between said third gear and said housing; a clutch device rotatably mounted on said shaft within said knob; releasable means normally connecting said knob and clutch device for movement as a unit; pinions mounted for rotation as a unit on said clutch device, each of said pinions engaging and being revolvable about one of said gears; switch means on said switch mounting plate operatively associated with said cam, said switch means being closed upon movement of said plate from a neutral position relative to said cam; said second gear having a diameter differing from that of the other two gears whereby revolution of said pinions about said gears will cause movement of said first and third gears relative to said second gear to move said position selector and said switch mounting plate relative to said cam; and driving means effective, upon closure of said switch means, to move said indicator into coincidence with said selector and to move said cam into a neutral position relative to said mounting plate to open said switch means.

4. A position preselecting and indicating mechanism comprising, in combination, a housing, said housing having a tubular extension with a splined outer end; a first gear having a hub portion extending through said extension into said housing, the inner end of said hub portion being splined; a cam rotatably mounted in said housing; a shaft secured to said cam and extending outwardly through and beyond said gear hub portion; a position indicator secured to the outer end of said shaft; a cup shaped knob rotatably mounted on said shaft; a splined sleeve rotatable on said tubular extension; a position selector mounted on said housing; a switch mounting plate rotatably mounted in said housing, said switch mounting plate being fixed to the inner end of said gear hub portion; a second gear fixed on the splined outer end of said tubular housing extension; a third gear fixed on the outer end of said splined sleeve; said second gear being mounted between said first gear and said third gear; said position selector being fixed to the inner end of said splined sleeve and being mounted between said third gear and said housing; a clutch device rotatably mounted on said shaft within said knob; releasable means normally connecting said knob and clutch device for movement as a unit; pinions mounted for rotation as a unit on said clutch device, each of said pinions engaging and being revolvable about one of said gears; switch means on said switch mounting plate operatively associated with said cam, said switch means being closed upon movement of said plate from a neutral position relative to said cam; said second gear having a diameter differing from that of the other two gears whereby revolution of said pinions about said gears will cause movement of said first and third gears relative to said second gear to move said position selector and said switch mounting plate relative to said cam; an electric motor mounted on said housing; gearing operatively connecting said motor to said cam; and circuit connections between said switch means and said motor.

5. A position preselecting and indicating unit comprising, in combination, a housing; said housing having a tubular extension; a shaft extending through said extension; a sleeve rotatably mounted on said shaft; a switch mounting plate in said housing secured to the inner end of said sleeve; a cam in said housing secured to the inner end of said shaft; a position selector mounted on said housing; means securing said selector against rotation relative to said sleeve; a position indicator; means securing said position indicator to the outer end of said shaft; a cup shaped knob rotatably mounted on said shaft; a clutch device rotatably mounted on said shaft within said knob; releasable means normally connecting said knob and clutch device for movement as a unit; reduction gearing mounted in said knob and operatively connecting said clutch device to said position selector and said switch mounting plate; switch means on said switch mounting plate operatively associated with said cam selectively operable by displacement of said cam from a neutral position and adapted to selectively control a positioning motor for a movable member; and means operable in concordance with the movable member to move said cam to a neutral position relative to said switch means.

6. A position preselecting and indicating unit comprising, in combination, a housing; said housing having a tubular extension; a shaft extending through said extension; a sleeve rotatably mounted on said shaft; a switch mounting plate in said housing secured to the inner end of said sleeve; a cam in said housing secured to the inner end of said shaft; a position selector mounted on said housing; means securing said position indicator to the outer end of said shaft; a cup shaped knob rotatably mounted on said shaft; a clutch device rotatably mounted on said shaft within said knob; releasable means normally connecting said knob and clutch device for movement as a unit; reduction gearing mounted in said knob and operatively connecting said clutch device to said position selector and said switch mounting plate; switch means on said switch mounting plate operatively associated with said cam selectively operable by displacement of said cam from a neutral position and adapted to selectively control a positioning motor for a movable member; and means operable in concordance with the movable member to move said cam to a neutral position relative to said switch means; said position selector and said position indicator each being formed with a protuberance whereby the relative positions thereof may be determined by the sense of touch of an operator.

7. A position preselecting and indicating mechanism comprising, in combination, a housing, said housing having a tubular extension with a splined outer end; a first gear having a hub portion extending through said extension into said housing, the inner end of said hub portion being splined; a cam rotatably mounted in said housing; a shaft secured to said cam and extending outwardly through and beyond said gear hub portion; a position indicator secured to the outer end of said shaft; a cup shaped knob rotatably mounted on said shaft; a splined sleeve rotatable on said tubular extension; a position selector mounted on said housing; a switch mounting plate rotatably mounted in said housing, said switch mounting plate being fixed to the inner end of said gear hub portion; a second gear fixed on the splined outer end of said tubular housing extension; a third gear fixed on the outer end of said splined sleeve; said second gear being mounted between said first gear and said third gear; said position selector being fixed to the inner end of said splined sleeve and being mounted between said third gear and said housing; a clutch device rotatably mounted on said shaft within said knob; releasable means normally connecting said knob and clutch device for movement as a unit; pinions mounted for rotation as a unit on said clutch device, each of said pinions engaging and being revolvable about one of said gears; switch means on said switch mounting plate operatively associated with said cam, said switch means being closed upon movement of said plate from a neutral position relative to said cam to selectively control a positioning motor for a movable member; said second gear having a diameter differing from that of the other two gears whereby revolution of said pinions about said gears will cause movement of said first and third gears relative to said second gear to move said position selector and said switch mounting plate relative to said cam; and means operable in concordance with the movable member to move said cam to a neutral position relative to said switch means.

WILLIAM P. LEAR.

REFERENCES CITED

The following references are of record in the file of this patent:

UNITED STATES PATENTS

| Number | Name | Date |
|---|---|---|
| 932,031 | Krone et al. | Aug. 24, 1909 |
| 1,559,525 | Murphy et al. | Oct. 27, 1925 |
| 1,731,776 | Henry | Oct. 15, 1929 |
| 1,954,142 | Moffett | Apr. 10, 1934 |
| 2,095,208 | Wilhelm et al. | Oct. 5, 1937 |
| 2,147,674 | Satterlee | Feb. 21, 1937 |
| 2,294,210 | Roters | Aug. 25, 1942 |
| 2,342,717 | Yardeny | Feb. 29, 1944 |
| 2,351,451 | Obszarny | June 13, 1944 |